US012731468B2

(12) United States Patent
Myers et al.

(10) Patent No.: US 12,731,468 B2
(45) Date of Patent: Sep. 8, 2026

(54) DIRECT DOCKING SELF-SERVICE KIOSK

(71) Applicant: TOSHIBA GLOBAL COMMERCE SOLUTIONS, INC., Durham, NC (US)

(72) Inventors: Robert A. Myers, Cary, NC (US); Daniel P. Kelaher, Fuquay-Varina, NC (US); Kevin J. Gierl, Cary, NC (US); William L. Dungan, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/968,948

(22) Filed: Dec. 4, 2024

(65) Prior Publication Data

US 2026/0155026 A1 Jun. 4, 2026

(51) Int. Cl.
*G07G 1/00* (2006.01)
*G07G 1/01* (2006.01)

(52) U.S. Cl.
CPC ......... *G07G 1/0018* (2013.01); *G07G 1/0072* (2013.01); *G07G 1/01* (2013.01)

(58) Field of Classification Search
CPC ... G07G 1/0018; G07G 1/0072; G06Q 20/208
USPC .......................................................... 235/383
See application file for complete search history.

(56) References Cited

U.S. PATENT DOCUMENTS

2013/0126248 A1* 5/2013 Yamaguchi ............ G01G 23/16 177/3
2023/0345093 A1* 10/2023 Yepez .................... G06Q 20/18
2024/0242578 A1* 7/2024 Yarlagadda .......... G07G 1/0063

FOREIGN PATENT DOCUMENTS

CN 114550388 A * 5/2022 ............ G06F 18/24

OTHER PUBLICATIONS

Machine translation of CN 114550388, retrieved from European Patent Office on Oct. 23, 2025 (Year: 2025).*

* cited by examiner

*Primary Examiner* — Suezu Ellis
(74) *Attorney, Agent, or Firm* — Patterson + Sheridan, LLP; Gero G. McClellan

(57) ABSTRACT

Embodiments herein describe a self-service kiosk or POS system that includes a base that is connected to an upper, vertical module. The base can include an item-receiving area where a customer places an item for purchase. This area can include a weight and/or pressure sensors. The upper module can include one or more cameras that have field of views that include the item-receiving area. The POS system can also include a computing system for using images captures by the camera (or cameras) to identify the item.

18 Claims, 11 Drawing Sheets

DIRECT DOCKING SELF-SERVICE KIOSK

BACKGROUND

Camera vision based self-service kiosks (also referred to herein as point of sale (POS) devices) often have cameras mounted on extended features in order to capture a wide field of view to identify the products being purchased. Shipping these kiosks is challenging due to the multiple cameras being positioned in a wide space. While these types of kiosks can be shipped as a single unit, this requires expensive, inefficient packaging and the kiosks are heavy and awkward to unpack and install. A kiosk can be made more compact for packaging by incorporating hinges to provide a folded design for the camera mounts, but this is complicated and costly.

DETAILED DESCRIPTION

Embodiments herein describe a self-service kiosk or POS system that includes a base that is connected to an upper, vertical module. The base can include an item-receiving area where a customer places an item for purchase. This area can include a weight and/or pressure sensors. The upper module can include one or more cameras that have field of views that capture the item-receiving area. The POS system can also include a computing system for using images captured by the camera (or cameras) to identify the item.

The base and upper module can include guiding features, such as rails or alignment pins, that couple together (or mate) to align the upper module to the base. Further, these guiding features can align an electrical connector on a connector card in the upper module with an electrical connector on a connector card in the base module (e.g., a Peripheral Component Interconnect Express (PCIe) connection). This electrical connection can permit the components in the base and upper module to communicate with each other, and can also permit the components in the upper module to be powered by a power supply in the base.

Designing a POS system with a separate base and upper (vertical) module has several non-limiting advantages. For example, the POS system can be shipped as separate components rather than one large component. Because the base and upper module may extend perpendicular to each other when mated (and the upper module can have an extension to support downward facing cameras) shipping them as one unit is bulky and expensive. However, when separated, both components may have substantially planar shapes so that shipping them becomes much easier. Having separable parts is also advantageous if a component in one of the parts fails or needs service. The base and the upper module can be separated and only the one that needs service can be shipped for repairs or maintenance.

Figure 1:
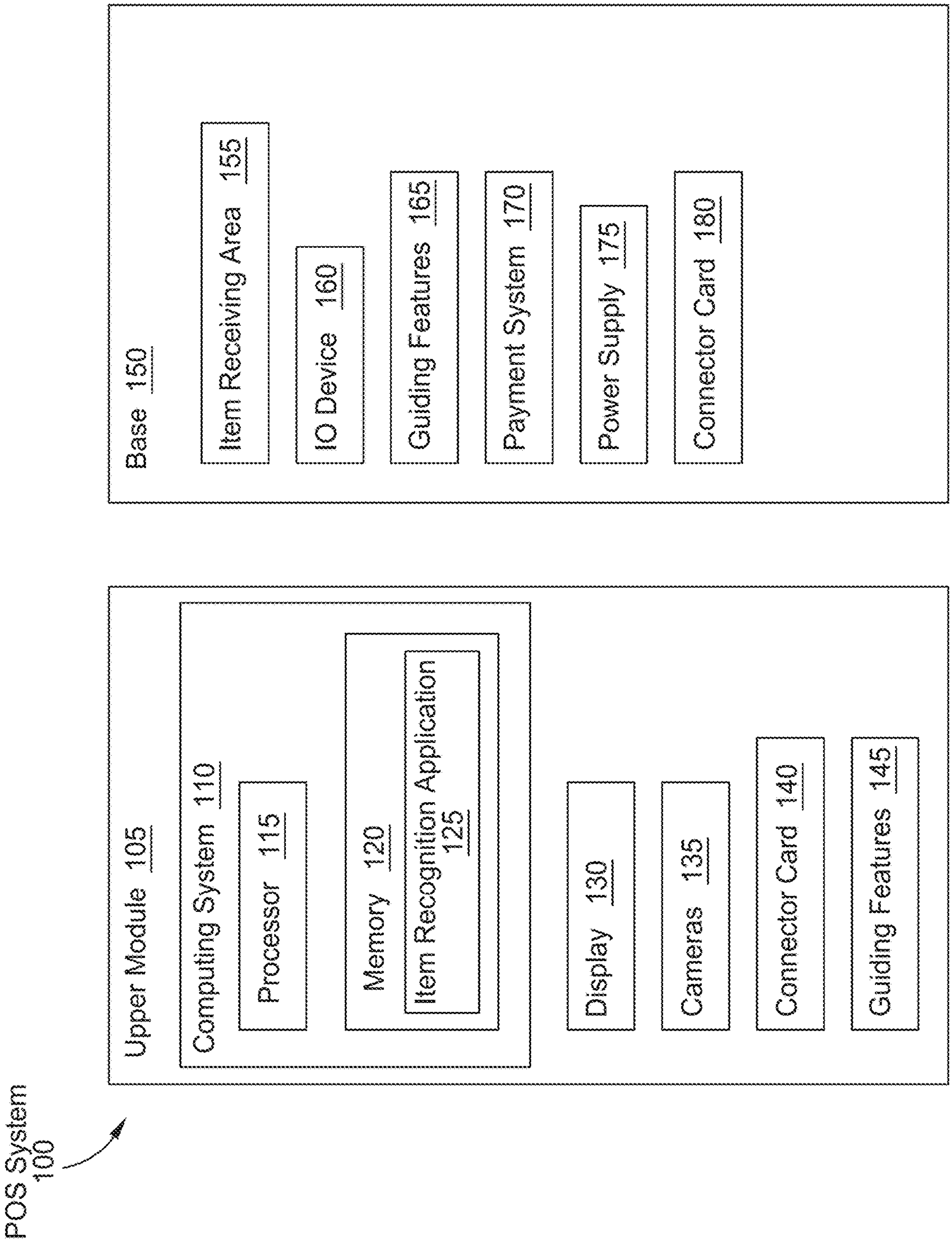
FIG. 1 is a block diagram of a POS system, in accordance with various aspects as described herein.

FIG. 1 is a block diagram of a POS system 100, according to one embodiment. The POS system 100 includes an upper module 105 that is connected to a base 150. The physical connection of these two components will be shown in the figures that follow.

The upper module 105 includes a computing system 100, a display 130, one or more cameras 135, a connector card, and guiding features 145. In one embodiment, the computing system 110 is an all-in-one (AIO) computer where each component of the computing system 110 is disposed within the upper module 105. In this example, the computing system 110 includes a processor 115 and memory 120. The processor 115 can represent one or more processing elements, where each processing element can include one or more processing cores. The memory 120 can include volatile memory elements, non-volatile memory elements, and combinations thereof. Here, the memory stores an item recognition application 125 (e.g., a software application) that uses images captured by the cameras 135 to identify an item for purchase using a computer vision algorithm (e.g., an artificial intelligence (AI) or machine learning (ML) model). While FIG. 1 illustrates using the POS system 100 to perform computer vision, in other embodiments, the POS system 100 may perform different functions, or other functions besides computer vision (e.g., scanning a barcode or reading a radio frequency identification tag (RFID)).

The display 130 can display information to the customer such as the identity of the item detected by the item recognition application 125, a list of items already purchased, cost of the items, etc. The display 130 could be a touch screen for user interaction, or may not have touch capabilities.

The cameras 135 can be disposed at locations in the upper module 105 to view an item-receiving area 155 in the base 150 on which the shopper places items for purchase. For example, a camera 135 may disposed in a downward direction. Moreover, to improve the ability of the item recognition application 125 to successful identify an item, cameras 135 may also be disposed on the sides of the upper module 105.

The connector card 140 can be a printed circuit board (PCB) that is communicatively coupled to the various electrical components in the upper module 105 (e.g., the computing system 110 and the cameras 135). As discussed in more detail below, in one embodiment, the connector card 140 has an electrical connection that is mated to a connector card 180 in the base 150. This communicatively couples the upper module 105 to the base 150 so that digital and power signals can be exchanged between the components.

The guiding features 145 can be any mechanical feature that connects (and aligns) the upper module 105 to the base 150. For example, the guiding features 145 can be rails, alignment pins, grooves, posts, fasteners, and the like. In one embodiment, the guiding features 145 in the upper module 105 have complementary surfaces with guiding features 165 in the base 150. For example, these features may form male and female parts that mate to connect the upper module 105 to the base 150. For example, the features 145, 165 can be rails that mate by slidably engaging, or the features 145, 165 can be pins and apertures, that register (one pin with one corresponding aperture) when the upper module 105 is properly aligned with the base 150, or the features 145, 165 may be tongue and grooves that mate together, and so forth.

In any case, in one embodiment, the guiding features 145, 165 form a reversible connection (e.g., a pluggable connection) that permits the upper module 105 to be disconnected from the base 150. That way, if one components breaks, it can be easily replaced. Or a component can be easily removed and shipped to a service center for repair or maintenance.

The base 150 includes the item-receiving area 155, an input/output (IO) device 160, the guiding features 165, a payment system 170, a power supply 175, and the connector card 180 (e.g., a PCB). As mentioned above, the item-receiving area 155 defines an area where a customer can place an item for purchase so it can be identified by the item recognition application 125. In one embodiment, the item-receiving area 155 can include a weight sensor (e.g., a scale) or pressure sensors to identify an outline of the item, but this is not a requirement.

The IO device 160 can be a touchscreen, buttons, and the like which the customer can use to interact with the POS system 100. For example, the customer can use the IO device 160 to confirm a purchase, select a payment option, correct a misidentified item for purchase, request help, and the like.

The payment system 170 can include a credit card reader, chip reader, near field communication (NFC) reader, coin/currency machine, and the like.

The power supply 175 can be used to provide power to the components in the base 150. In addition, in one embodiment, once the upper module 105 is connected to the base 150, the power supply 175 provides power to the components in the upper module 105. This could avoid a second power supply in the upper module 105, which can reduce weight and have only one power cord for the POS system 100. However, in other embodiments, a power supply can also be disposed on the upper module 105 (or the upper module 105 could include a power supply that supplies power to the components in the base 150).

The arrangements of the components in the upper module 105 and the base 150 is just one example. In other embodiment, some components shown in the base 150 may be in the upper module 105, and vice versa. Further, the computing system 110 may have some components in the base 150 and the upper module 105. Moreover, some of the components shown in FIG. 1 may not be in other implementations of a POS system. For example, the IO device 160 may be omitted if the display 130 is a touch-enabled display and is reachable by the customer.

Further, while the POS system 100 illustrates two main components, it can include other separate components not shown here. For example, ancillary components may be mounted or connected to the upper module 105 and the base 150.

Figure 2:
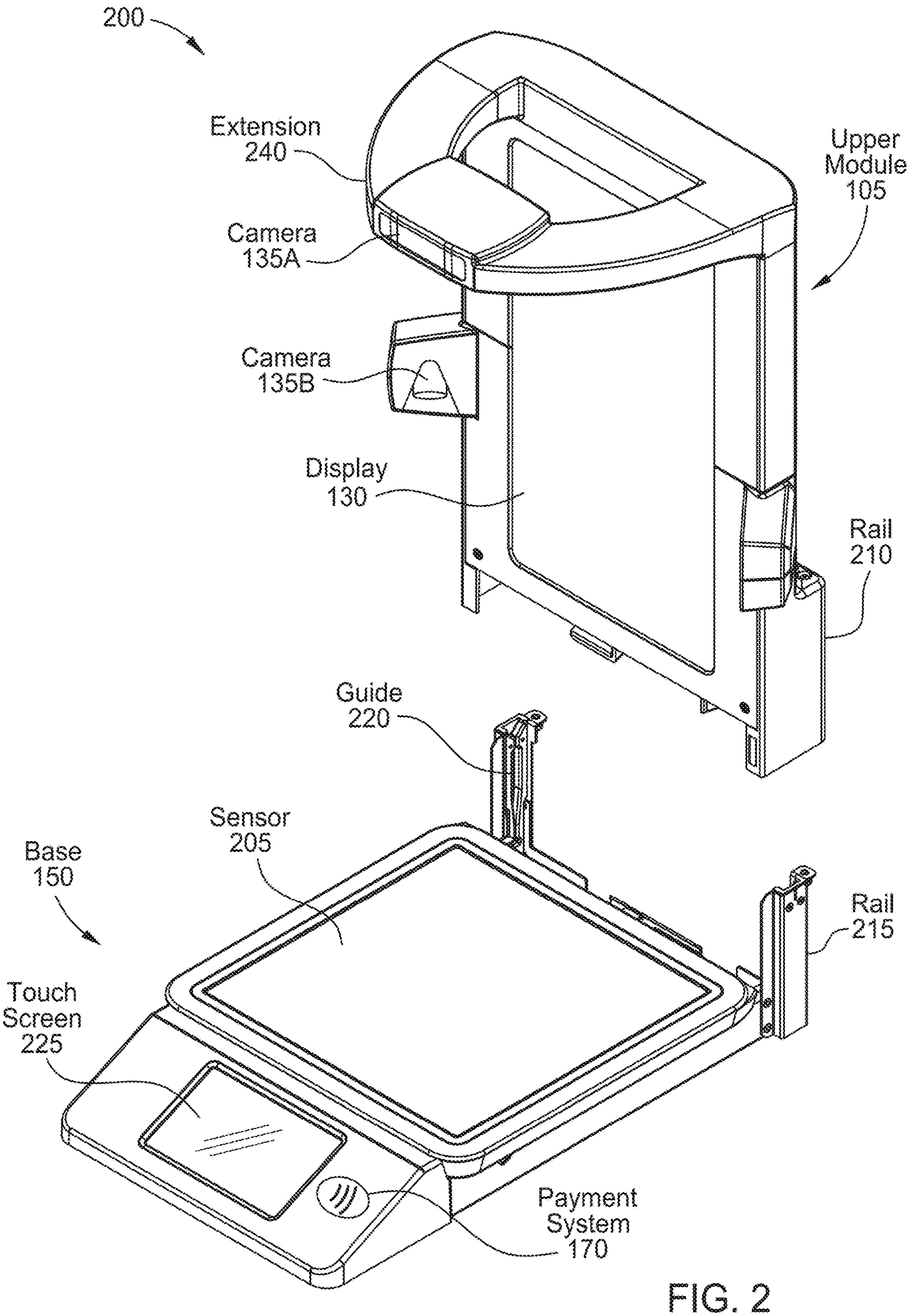
FIG. 2 illustrates connecting an upper module to a base of a POS system, in accordance with various aspects as described herein.

FIG. 2 illustrates connecting an upper module 105 to a base 150 of a POS system 200, according to one embodiment. As shown, the base 150 generally extends in a horizontal direction or plane that is parallel with the earth's surface while the upper module 105 generally extends in a vertical direction or plane that is perpendicular to the base 150. As such, when connected, the upper module 105 forms a right angle with the base 150.

To make this connection, the upper module 105 includes rails 210 while the base 150 includes rails 215 which extend in the vertical direction. The rails 210, 215 are examples of the guiding features 145, 165 discussed in FIG. 1. In this example, a technician can align the upper module 105 so that the rails 210 slidably engage with a respective one of the rails 215. For example, the rails 210, 215 can include complementary surfaces so that sliding the rails together align and hold the upper module 105 in a vertical position.

In addition, the base 150 include a guide 220 within at least one of the rails 215. The guide 220 (which is another example of the guiding features 165 in FIG. 1) defines a vertical groove that permits an edge of the connector card in the upper module 105 (not shown in FIG. 2) to slide within in this groove. Doing so further aligns an electrical connector of the connector card in the upper module 105 with an electrical connector of the connector card in the base 150. For example, mating the rails 210, 215 may provide a rough alignment between the upper module 105 and the base 150 while mating the edge of the connector card with the guide 220 provides a fine alignment so that the connector cards in the upper module 105 and the base 150 have precise alignment. As such, a technician can lower the upper module 105 so that the electrical connectors in the connector cards mate thereby establishing an electrical connection between the upper module 105 and the base 150, as well as a mechanical connection.

In this example, the base 150 includes a sensor 205 which defines the item-receiving area for the POS system 200. The sensor 205 can measure weight, pressure, forces, etc.

The upper module 105 includes side cameras—i.e., a left-side camera 135B and a right-side camera (but the right-side camera is occluded since it is mounted on a portion that is rotated relative to the view illustrated in FIG. 2). The side cameras have field of views that capture the area defined by the sensor 205 (i.e., the item receiving region). Thus, the side cameras capture images of different sides of the items that are placed on the sensor 205.

In addition, the upper module 105 has an extension 240 on which a downward facing camera (not shown) can be mounted which has a field of view that looks down onto the sensor 205. The extension can permit a downward facing camera to have a better view of the sensor 205 relative to placing a camera on the same surface as the display 130. An example of the downward facing camera is discussed in FIG. 6 below.

Using the images captured by the side cameras and the downward facing camera, the item recognition application can identify the items for purchase. While three cameras can be used, in other embodiments, more cameras can be used, or fewer cameras can be used (e.g., only a downward facing camera). For example, if the cameras are used for theft detection, rather than product identification, one camera may be sufficient.

In addition to a downward facing camera, in this example the extension 240 also supports a forward facing camera 135A, relative to the customer. The POS system 200 can use this camera 135A to capture images of the customer, for example, to automatically identify the customer as a member of a store's loyalty program or to provide theft detection.

The base 150 also includes a touch screen 225 which is one example of the IO device 160 in FIG. 1. The touch screen 225 can display options to the user such as confirming an item was correctly identified, calling for help, selecting a payment method, and the like.

Figure 3B:
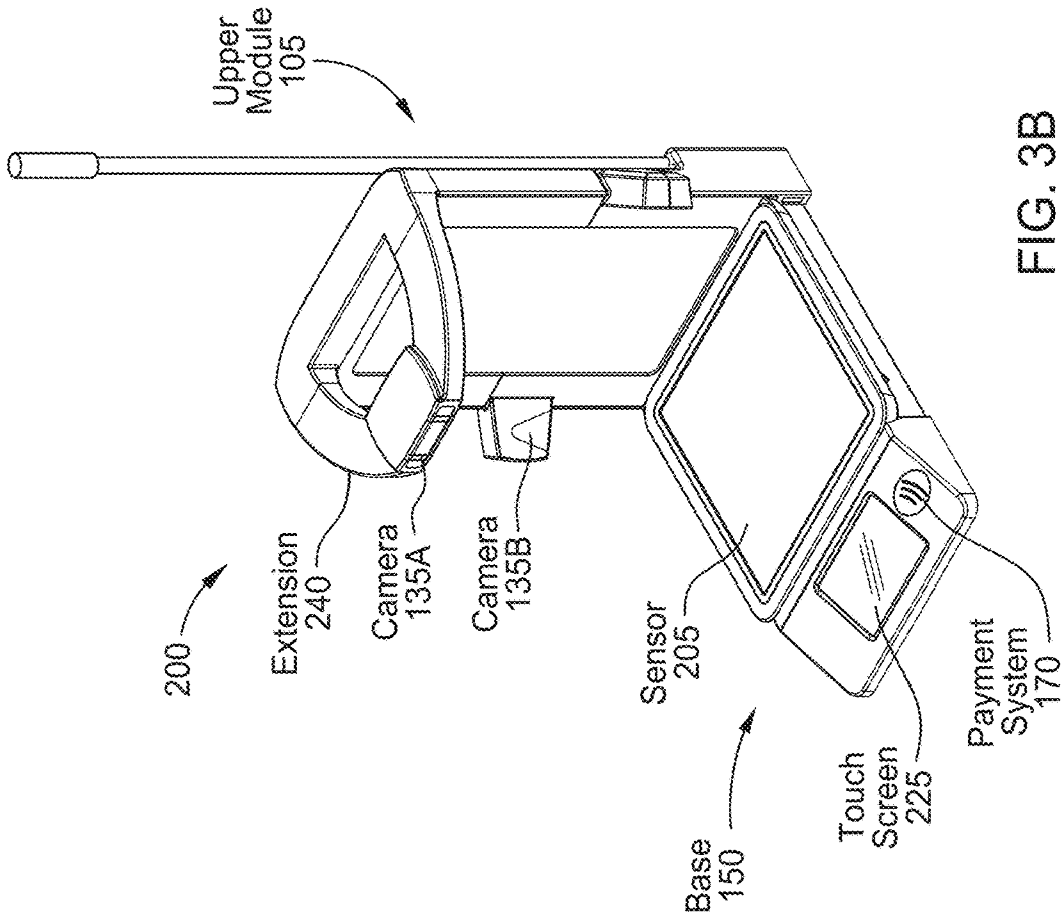
FIGS. 3A and 3B illustrate different views of the connected POS system illustrated in FIG. 2, in accordance with various aspects as described herein.
Figure 3A:
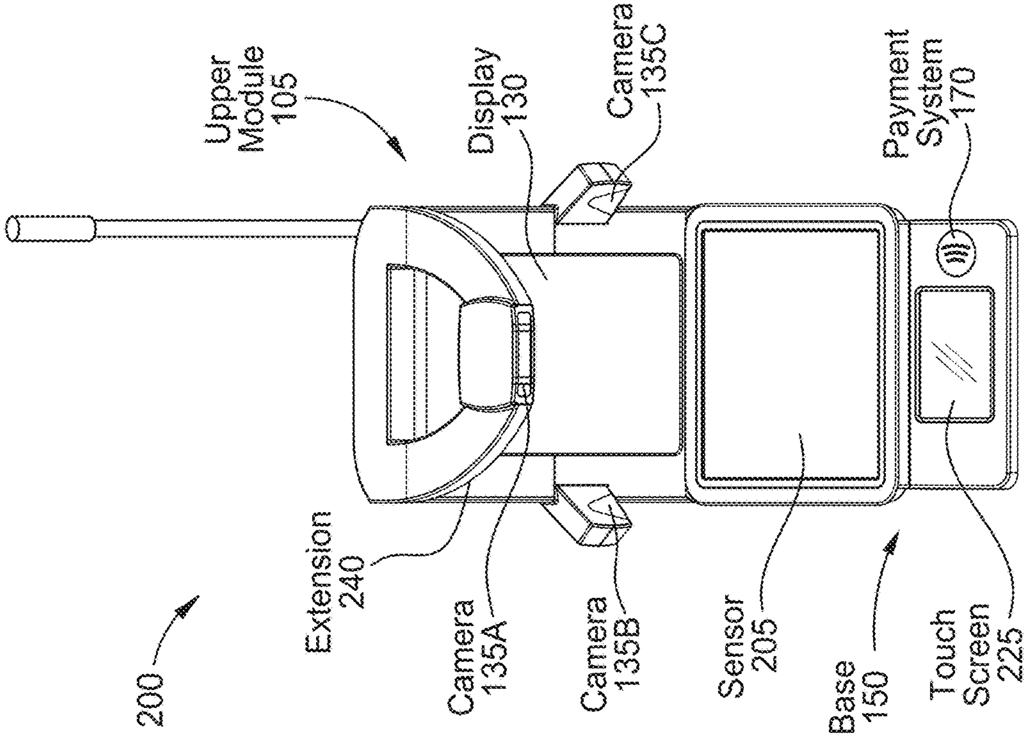

FIGS. 3A and 3B illustrate different views of the connected POS system illustrated in FIG. 2, according to one embodiment. FIG. 3A illustrates a front view of the POS system 200 in FIG. 2 while FIG. 3B illustrates an angled view of the POS system 200.

In FIG. 3A, this view permits a right-side camera 135C to be seen. The field of views of the right-side camera 135C and the left-side camera 135B can capture different sides of an item on the sensor 205 which, as discussed above, can aid in item recognition.

Figure 4A:
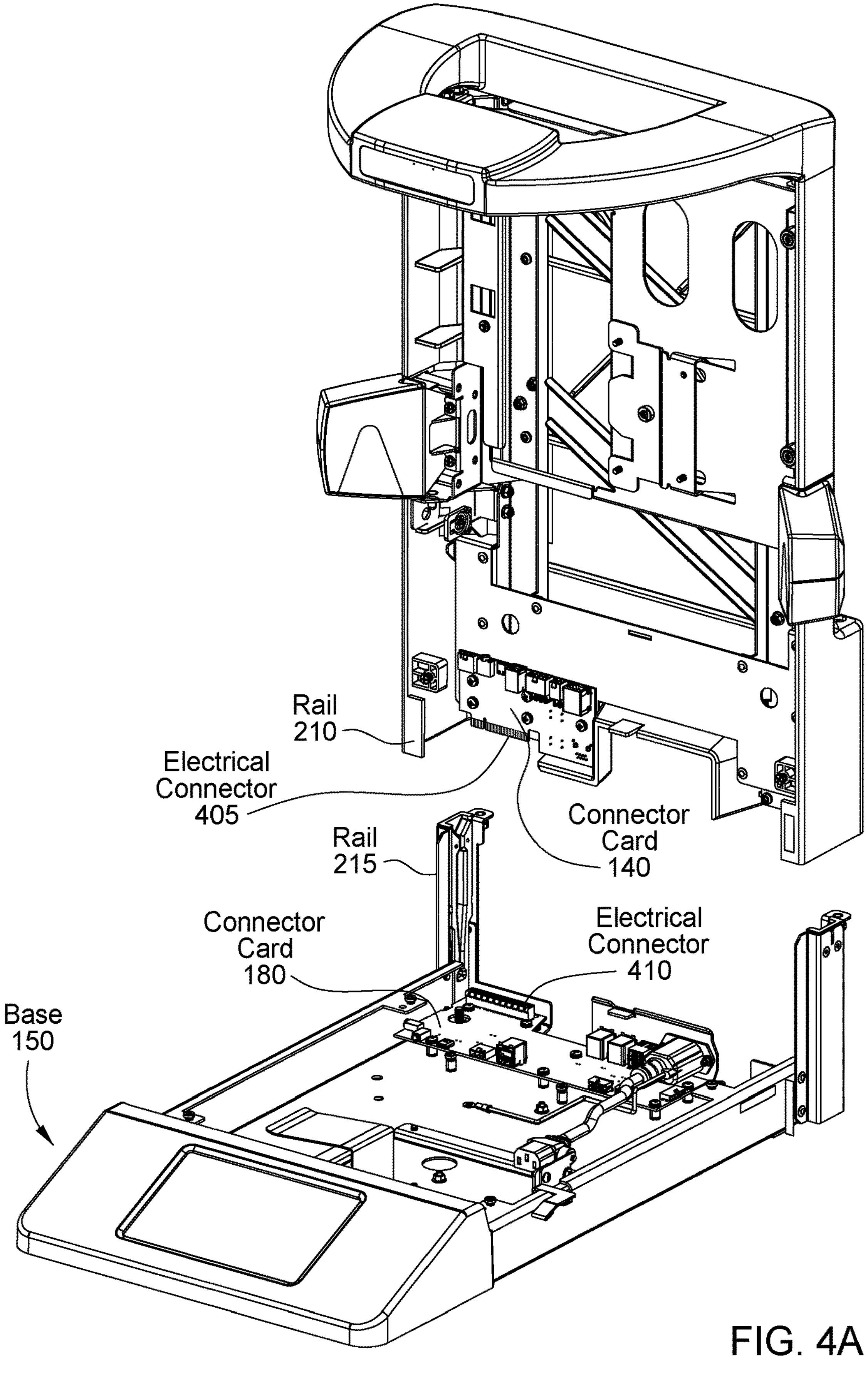
FIGS. 4A-4C illustrates stages of connecting an upper module to a base of POS system, according to one embodiment.
Figure 4B:
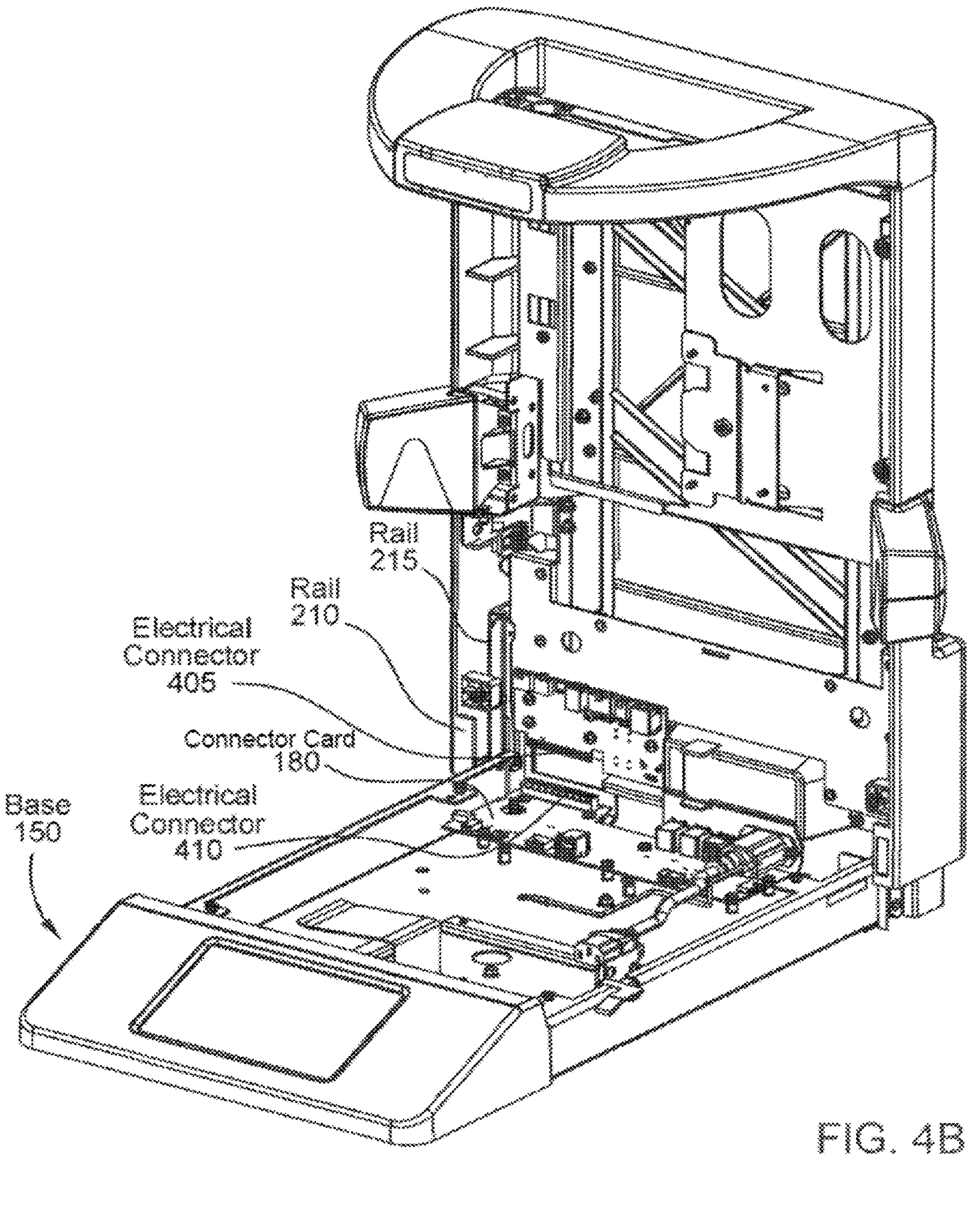
Figure 4C:
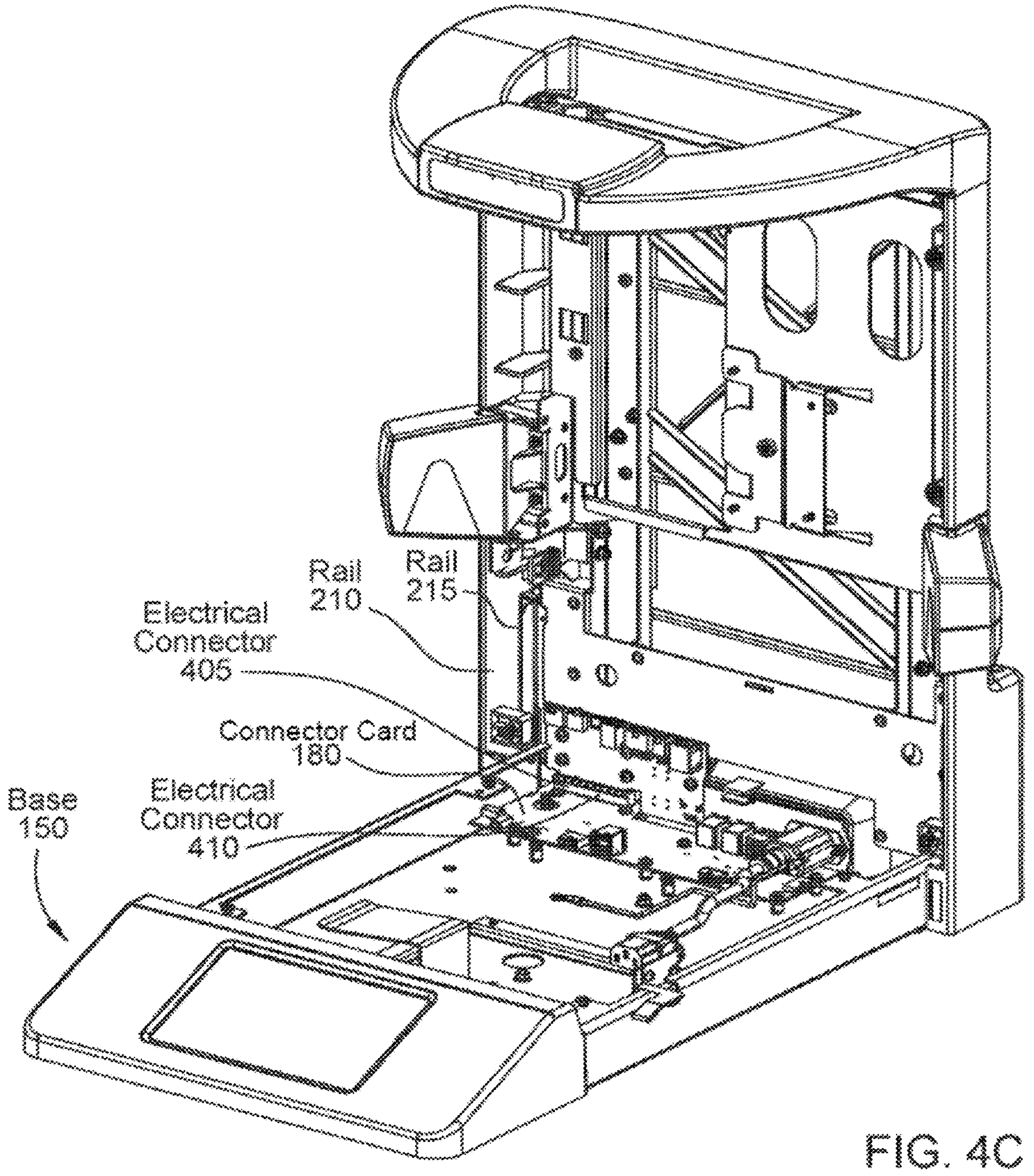

FIGS. 4A-4C illustrates stages of connecting an upper module to a base of POS system, according to one embodiment. For clarity, the front surface of the upper module 105 and the sensor of the base 150 have been omitted so that the internal components can be seen. Namely, FIGS. 4A-4C illustrate the connector card 140 in the upper module 105 and the electrical connector 410 in the base 150. As shown, the connector card 140 in the upper module 105 can extend in the vertical direction/plane while the electrical connector 410 in the base 150 extends in the horizontal direction/plane.

In this embodiment, the connector card 140 includes a male electrical connector 405 that mates with a female electrical connector 410 on the connector card 180. For example, the electrical connectors 405, 410 can form a PCIe connection, but any suitable data connection technique can be used.

FIG. 4B illustrates moving the upper module 105 down (relative to its position in FIG. 4A) to slidably engage the rails 210 in the upper module 105 with the rails 215 in the base 150. Doing so aligns the upper module 105 to the base 150 as well as provides physical stability to the upper module 105. More specifically, engaging the rails 210, 215 can align the electrical connectors 405, 410.

In one embodiment, the rails 210, 215 can provide a rough alignment while a fine alignment can be achieved by inserting the left edge of the connector card 140 into a guide (e.g., the guide 220 in FIG. 2) located in the left rail 215 of the base 150. The mating between the guide and the edge of the connector card 140 can further ensure the connectors 405, 410 are aligned so the electrical connections are not damaged as the upper module 105 is lowered onto the base 150.

FIG. 4C illustrates the upper module 105 and the base 150 being fully connected where the electrical connector 405 is seated within the electrical connector 410. In addition, the rails 210, 215 may include stops so that when the stops engage on the rails 210, 215, the electrical connectors 405, 410 are mated. This prevents the full weight of the upper module 105 from being supported by the electrical connector 410 and the connector card 180.

Figure 5:
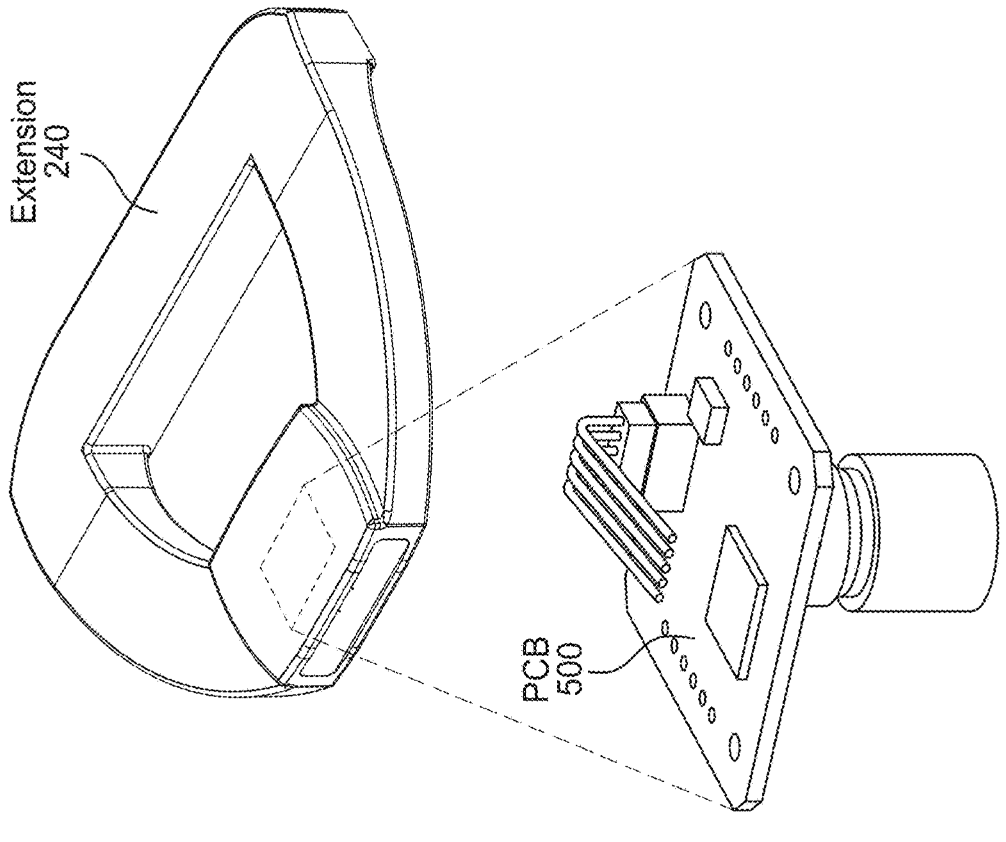
FIG. 5 illustrates a down facing camera in the upper module, according to one embodiment.

FIG. 5 illustrates a down facing camera 135D in the upper module, according to one embodiment. As shown, the camera 135D is mounted within the extension 240 so it faces straight down and its field of view captures the item receiving region on the base. In this example, the camera 135D is mounted onto a PCB 500 in the extension 240 but any suitable mounting technique can be used.

Figure 6:
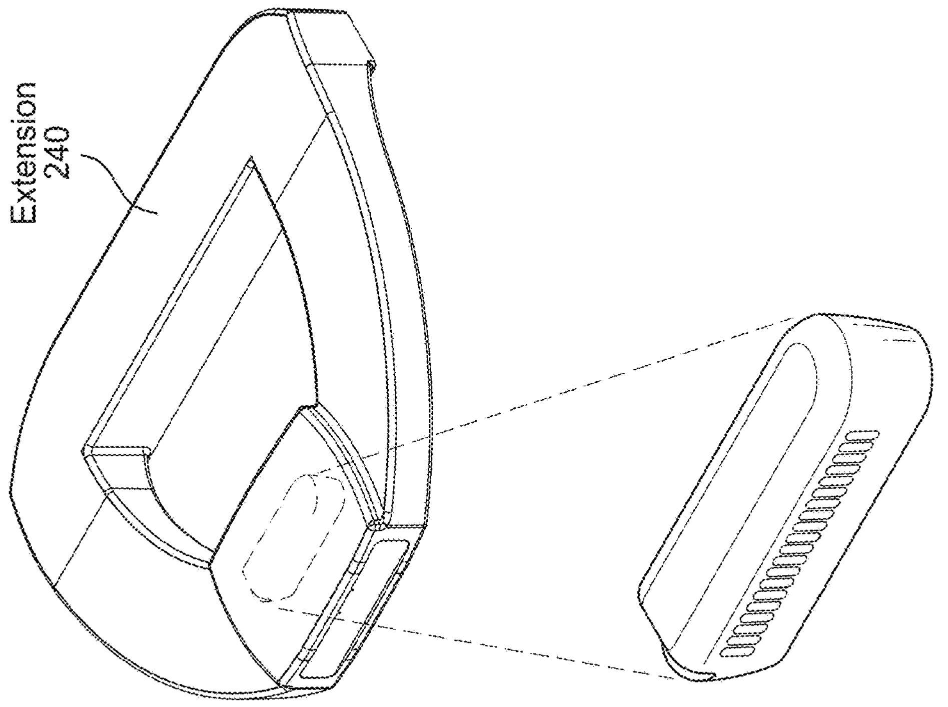
FIG. 6 illustrates a down facing 3D sensor in the upper module, according to one embodiment.

FIG. 6 illustrates a down facing 3D sensor 600 in the upper module, according to one embodiment. As shown, the 3D sensor 600 is mounted within the extension 240 so it faces straight down and its field of view captures the item receiving region on the base. The 3D sensor 600 may be able to capture more detailed information on an item for purchase, including its size, shape, and position than can be captured by a normal image capture.

In one embodiment, the extension 240 includes both the 3D sensor 600 and an image camera, such as the camera 135D illustrated in FIG. 5.

Figure 7:
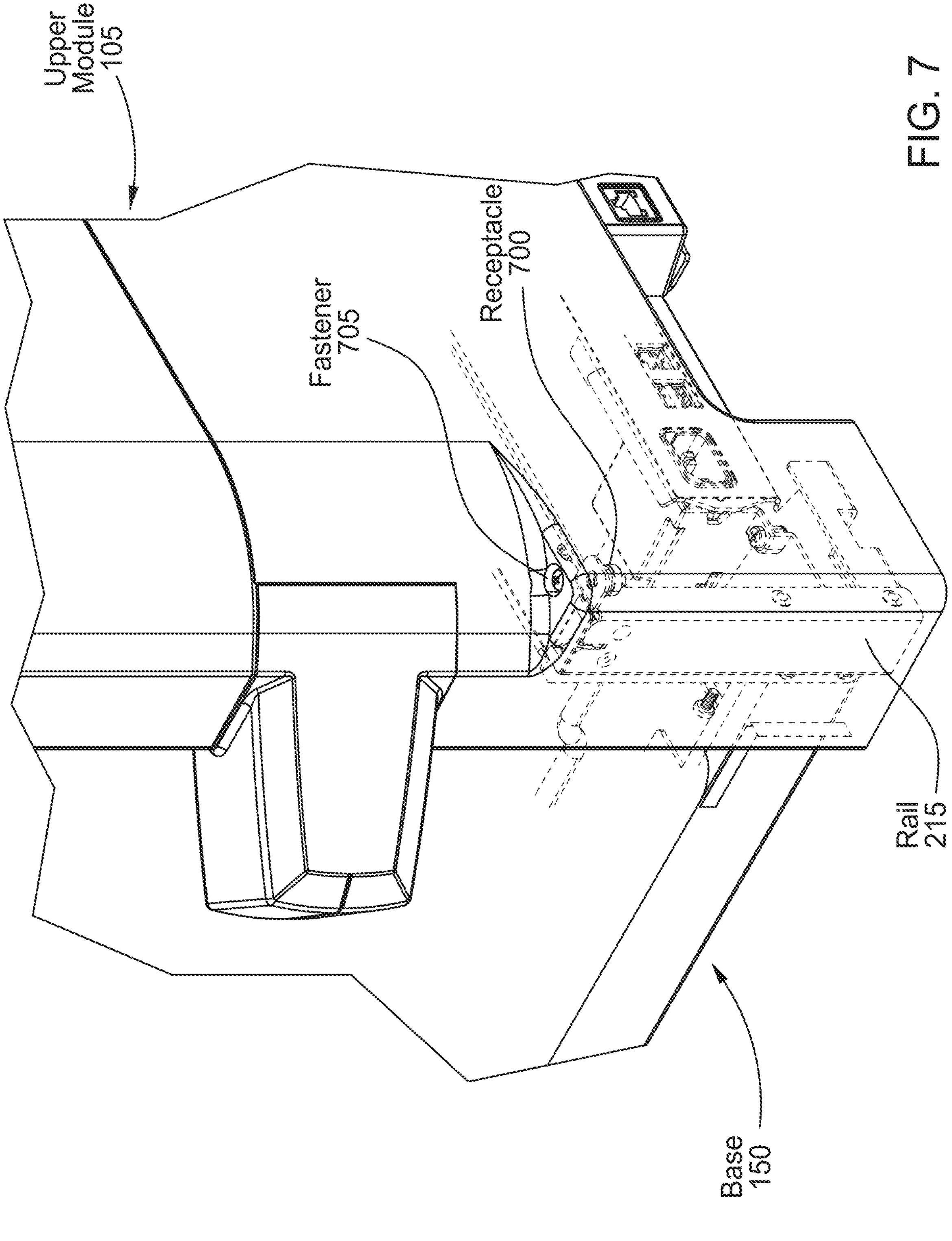
FIG. 7 illustrates a connection system for connecting the upper module to the base, according to one embodiment.

FIG. 7 illustrates a connection system for connecting the upper module to the base, according to one embodiment. FIG. 7 illustrates the POS system in a connected state, such as the state illustrated in FIGS. 3A, 3B, and 4C. Specifically, FIG. 7 illustrates a back view of the POS system that illustrates a back of the upper module 105.

As shown, the rail 215 for the base 150 includes a receptacle 700 where a fastener 705 is attached. For example, the fastener 705 may be a screw or a bolt that is inserted into the receptacle 700. When fastened, the fastener 705 provides additional mechanical support to attach the upper module 105 to the base 150.

Figure 8:
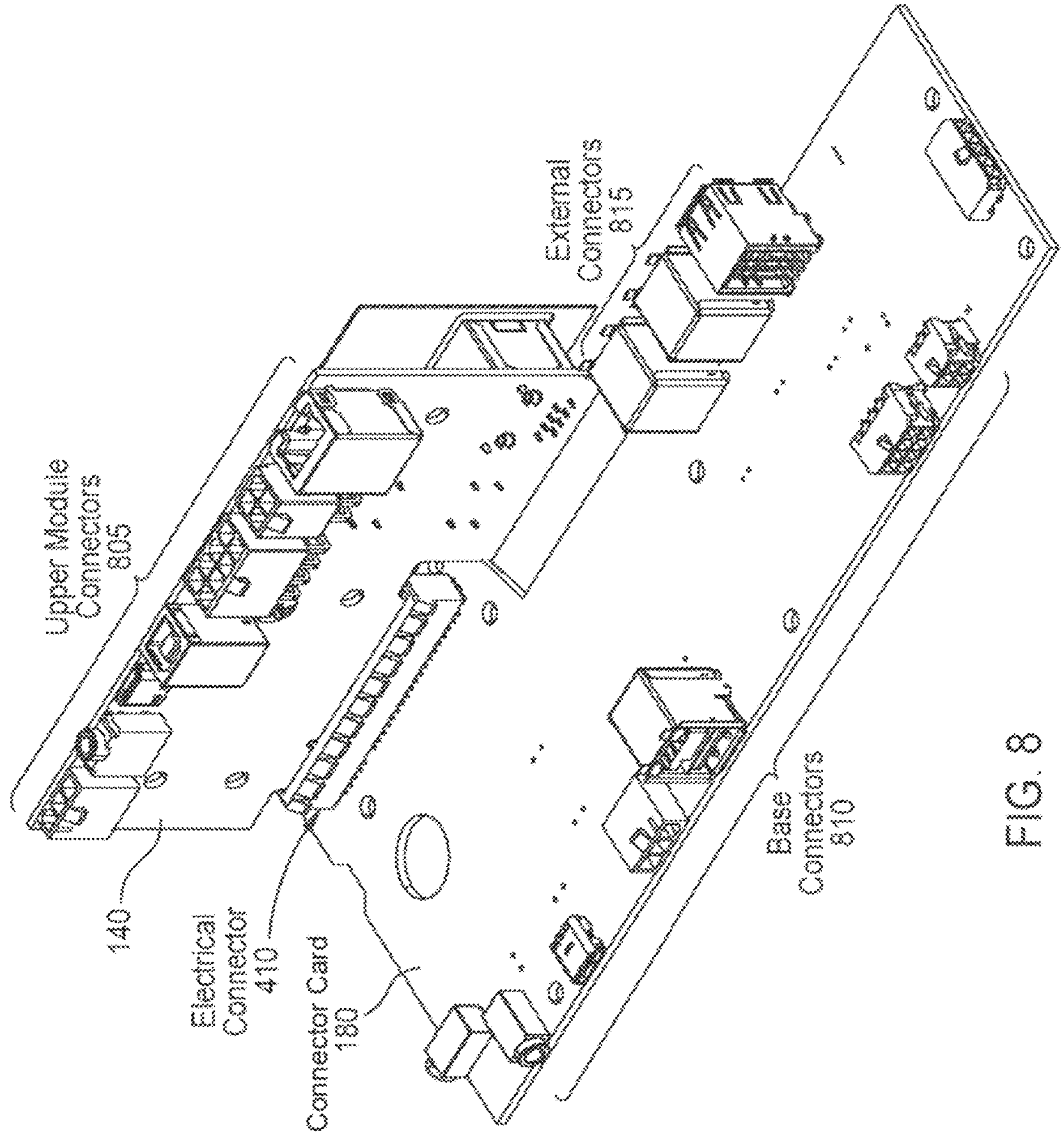
FIG. 8 illustrates mating connector boards in the upper module and the base, according to one embodiment.

FIG. 8 illustrates mating connector boards 140, 180 in the upper module and the base, according to one embodiment. In this implementation, the connector card 140 includes upper module connectors 805 that connect to the other components in the upper module, such as the computing system, display, camera, and the like. The upper module connectors 805 can include both data connectors as well as power connectors to supply power to those components.

The connector card 180 includes the male electrical connector 410 which, as discussed in FIGS. 4A-4C mates with the female electrical connector in the connector card 140. The connector board 180 also includes base connectors 810 that connect to the other components in the base, such as weight/pressure sensors, IO device, payment systems, and the like. The base connectors 810 can include both data connectors as well as power connectors to receive power from a power supply in the base and then provide that power to the connector card 140 (assuming the power supply is in the base).

The connector card 180 also includes external connections 815 which permit the POS system to be connected to other devices, such as a hand scanner, printer, a network, and the like. In this manner, additional components with different functionalities can be added to the POS system and managed by the computing system in the POS system.

Figure 9:
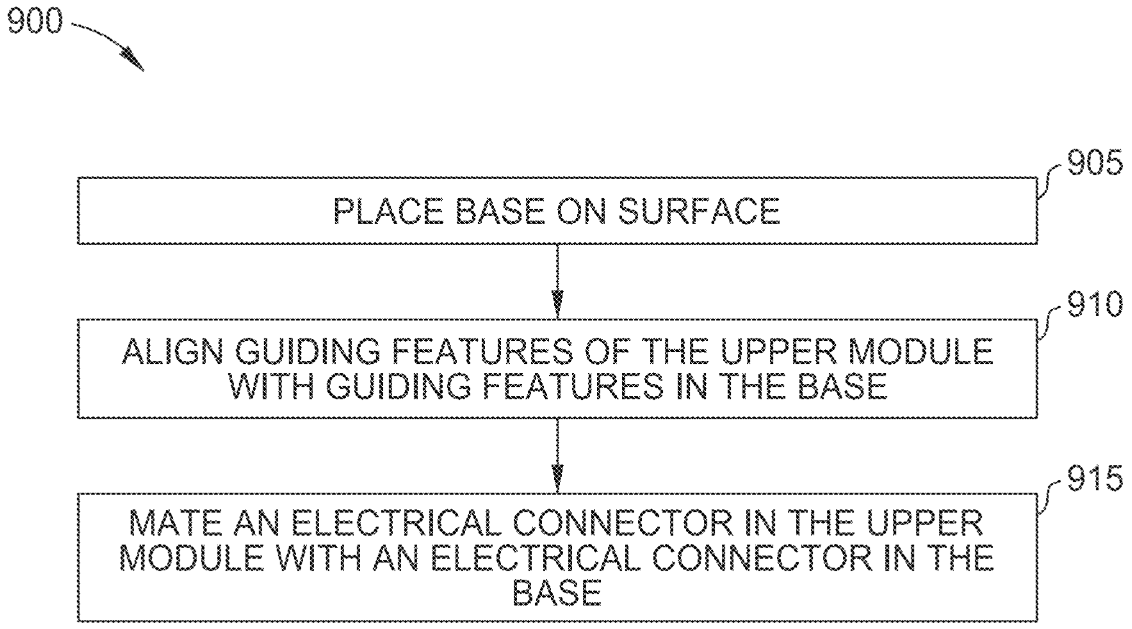
FIG. 9 is a flowchart for connecting an upper module to a base in a POS system, according to one embodiment.

FIG. 9 is a flowchart of a method 900 for connecting an upper module to a base in a POS system, according to one embodiment. At block 905, a technician places the base on a solid surface, e.g., a counter or platform.

At block 910, the technician aligns guiding features of the upper module with guiding features in the base while moving the upper module down onto the base. As mentioned above, these guiding features can be rails, alignment pins, grooves, posts, and the like. In one embodiment, guiding features in the upper module have complementary surfaces with guiding features in the base. In one embodiment, the guiding features in the upper module mates with guiding features in the base.

At block 915, the electrical connector in the upper module mates with an electrical connector in the base as the upper module moves downward onto the base. In one embodiment, the technician does not perform any special action to align the electrical connectors. That is, once the guiding features are aligned, this may passively align the electrical connectors so that as the technician lowers the upper module the electrical connectors form a proper connection.

In one embodiment, the upper module is also fastened to the base (e.g., the upper module is secured to the base). This can be performed using quarter turn fasteners, screws, bolts, or any other suitable latching and de-latching mechanisms.

In one embodiment, the method 900 is reversible so that the upper module can be lifted off the base by a technician.

Figure 10:
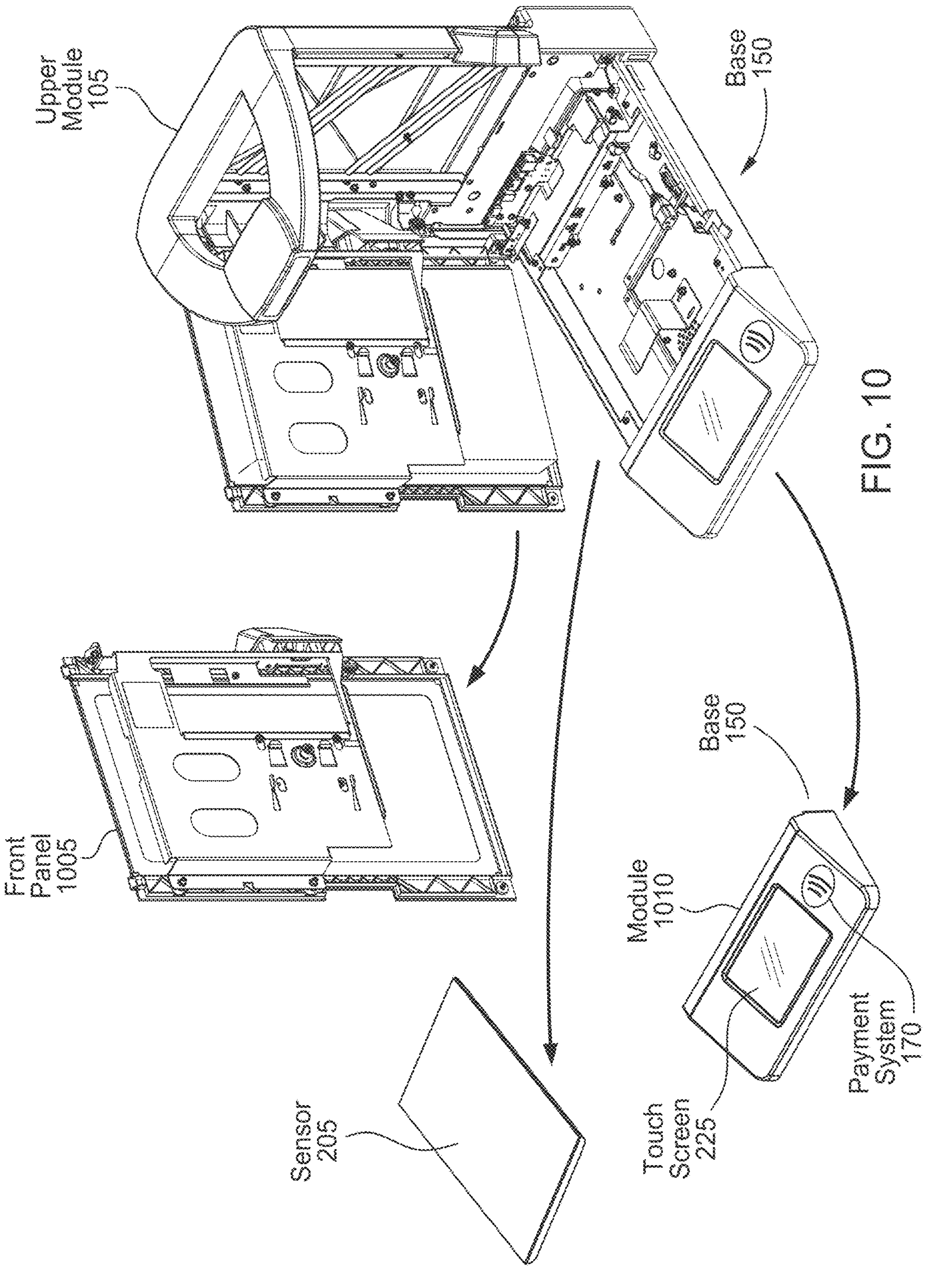
FIG. 10 illustrates modularity of the components in the POS system, according to one embodiment.

FIG. 10 illustrates modularity of the components in a POS system, according to one embodiment. In this example, the front panel 1005 can be removed from the upper module 105 as a separate module. For example, the front panel 1005 can be connected to the upper module 105 using a hinge on the left side and a latch or fasteners on the right side. Once the latch is opened or the fasteners are removed, the front panel 1005 can be rotated to the position illustrated in FIG. 10. This also provides easy access to the inside of the upper module 105 to remove other components or to perform service. Also, the front panel 1005 can be removed by, e.g., lifting it off the hinge.

The front components 1005 can include some of the components in the upper module 105 such as the display and/or the computing system. In some embodiments, the front panel 1005 can be further disassembled to access the various components in the panel.

FIG. 10 also illustrates that the sensor 205 can be a modular component that is removed from the base while the base 150 remains attached to the upper module 105. Similarly, the touch screen 225 and the payment system 170 can be in a module 1010 that can be removed from the base 150.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to the described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

While the foregoing is directed to one or more embodiments, other and further embodiments may be devised without departing from the basic scope thereof, and the scope thereof is determined by the claims that follow.

What is claimed is:

1. A point of sale (POS) system comprising:

a base defining an item-receiving area for receiving an item for purchase, wherein the base comprises first guiding features, wherein the first guiding features comprises at least two rails extending vertically from the base; and an upper module comprising:

second guiding features configured to mate with the first guiding features to align the upper module to the base and form a reversible connection with the base, wherein, when connected, the upper module extends vertically from the base, and one or more cameras arranged with field of views that include the item-receiving area when the upper module is attached to the base.

2. The POS system of claim 1, wherein the base further comprises a first connector card with a first electrical connector and the upper module comprises a second connector card with a second electrical connector, wherein the first electrical connector mates with the second electrical connector when the upper module is attached to the base.

3. The POS system of claim 2, wherein the base further comprises a power supply, wherein the power supply is configured to provide power to the upper module using the first and second electrical connectors.

4. The POS system of claim 3, wherein upper module comprises a computing system configured to receive power from the power supply, wherein the computing system is configured to execute an item recognition application to identify the item using images captured by the one or more cameras.

5. The POS system of claim 4, wherein the upper module further comprises a display configured to receive power from the power supply and display the identity of the item determined by the item recognition application.

6. The POS system of claim 2, wherein the first and second electrical connectors are Peripheral Component Interconnect Express (PCIe) connectors and the first and second connector cards are printed circuit boards.

7. The POS system of claim 1, wherein second guiding features comprises at least two rails with complementary surfaces that slidably engage with the at least two rails of the first guiding features.

8. The POS system of claim 1, wherein the upper module comprises an extension that extends from the upper module in a horizontal direction, wherein the one or more camera are mounted in the extension to face downward towards the base when the upper module is attached to the base.

9. The POS system of claim 8, wherein the upper module comprises at least one side mounted camera that captures a side view of the item when placed on the item-receiving area.

10. The POS system of claim 1, wherein the base further comprises a sensor for at least weighing the item, wherein a surface of the sensor defines the item-receiving area.

11. The POS system of claim 1, wherein the base further comprises a payment system and a touch enabled display.

12. A method comprising:

providing a base of a point-of-sale (POS) system, the base defining an item-receiving area for receiving an item for purchase;

aligning first guiding features of the base with second guiding features of an upper module of the POS system, wherein, when the upper module is attached to the base based on the alignment provided by the first and second guiding features, the upper module extends vertically from the base; and mating a first electrical connector in the base with a second electrical connector in the upper module based on the alignment provided by the first and second guiding features.

13. The method of claim 12, wherein the upper module comprises at least one camera, the method further comprising:

capturing images of an item in the item-receiving area using the at least one camera; and detecting an identity of the item using a computing system in the upper module.

14. The method of claim 13, further comprising:
displaying the identity of the item on a display on the upper module.

15. The method of claim 14, further comprising:
providing power to the computing system and the display in the upper module using a power supply in the base.

16. The method of claim 13, wherein the upper module comprises an extension that extends from the upper module in a horizontal direction, wherein the at least one camera is mounted in the extension to face downward towards the base when the upper module is attached to the base.

17. The method of claim 16, wherein the upper module comprises a side mounted camera, the method further comprising:
capturing images of the item in the item-receiving area using the side mounted camera, wherein the identity of the item is detected by the computing system using the images captured by both the at least one camera and the side mounted camera.

18. The method of claim 12, wherein aligning the first guiding features with the second guiding features comprises:
slidably engaging the first guiding features with the second guiding features.

* * * * *